June 28, 1932.   J. S. RODGERS   1,864,859

HARROW

Filed Feb. 1, 1930

Inventor:
John S. Rodgers,
by Jas. L. Skidmore
Att'y.

Patented June 28, 1932

1,864,859

UNITED STATES PATENT OFFICE

JOHN S. RODGERS, OF CHARLEROI, PENNSYLVANIA

HARROW

Application filed February 1, 1930. Serial No. 425,193.

This invention has relation to a combined harrow frame and teeth therefor, and is especially designed for the purpose of providing an improved harrow.

The main object of the invention is to provide an economical, simple, strong, durable and efficient harrow for the purpose intended.

Another object of the invention is to so construct the harrow frame and the teeth connected with said frame, that the longevity of the harrow shall be materially increased.

Further objects of the invention are to so construct the harrow frame and the teeth connected therewith as to prevent the usual rapid deterioration of the harrow frame; the distribution of the pressure against the teeth throughout the frame when the harrow is in operation; to provide means rigidly and removably secured to the underside of the harrow frame for securely supporting each tooth within its socket formed in the underside of the frame, said means being adapted to receive the pressure exerted against each tooth when in use, and teeth so formed as to prevent the shortening of the tooth when the tooth is subjected to the sharpening operation.

The foregoing and such other objects as may appear from the ensuing description are accomplished by the construction, arrangement, combination and location of the several parts hereinafter more fully described, illustrated in the accompanying drawing and more particularly pointed out in the claim appended hereto, it being understood that slight changes in the precise form, proportions and minor details of construction may be resorted to without departing from the spirit or sacrificing any of the advantages of the invention.

In the accompanying drawing forming a part of this specification it will be seen that:

Figure 1:
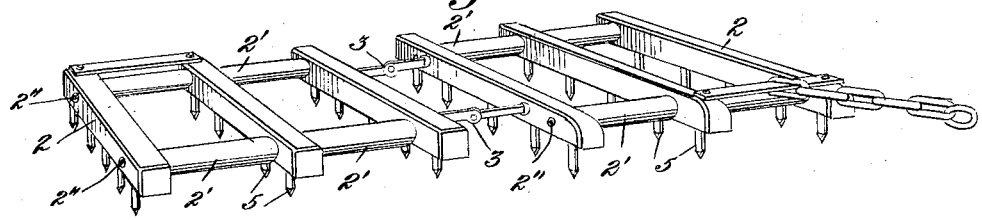
Figure 1 is a perspective of the improved harrow embodying my invention.
Figure 2:
Figure 2 is a side elevation showing the harrow turned upside down into a position it is caused to assume when it is desired to transfer or move the harrow over the unplowed ground from one location to another.

In the embodiment of my invention as illustrated it will be seen by reference to Figure 1 that the harrow frame is composed of sections, each section being formed by the longitudinal bars 2, and each of said bars 2 being spaced at a suitable distance apart and fixedly secured to each other by any suitable or desirable connecting means, as is shown at 2' and 2'', said sections being pivoted together by suitably constructed hinges 3, so that the sections can be folded upon each other when desired for storage purposes, or when separated.

It will be perceived that in the lower face of each of the bars constituting the frame is formed a series of sockets, preferably of annular formation, for the reception of the headed or upper end portion 4 of each harrow tooth 5, and rigidly secured to the lower face of each bar, below the headed portion of each tooth, and resting in contact therewith, is a suitable clamping member 6, said member being fixedly secured beneath the headed portion of each tooth by a plurality of headed screw bolts 7 whereby each tooth is securely maintained in its fixed position within the frame in order to prevent it from working downwardly under all conditions, yet may be readily detached from the frame for sharpening purposes when desired, by the removal of the headed screw bolts with the ordinary tool, and detaching the clamping members, as will be readily understood.

Figure 3:
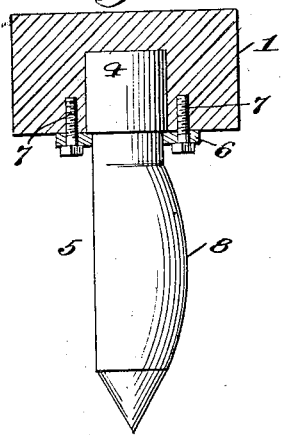
Figure 3 is a cross-sectional elevation taken through one of the bars or beams of the frame, showing a tooth in elevation fixedly secured to said bar or beam.

By reference to Fig. 3 it will be seen that the tooth 4 is formed with an excess of metal 8 intermediate its length preferably on the rear or disengaged surface thereof when in use, whereby when it is desired to sharpen the tooth the blacksmith can draw or force the excess of metal toward the pointed end of the tooth without shortening or reducing its length; said formation of tooth also serving to furnish more additional frictional bearing surface for tillage.

Figure 4:
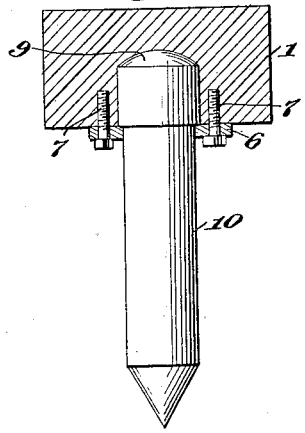
Figure 4 is a similar view showing a slightly modified form of tooth secured within the frame.
Figure 5:
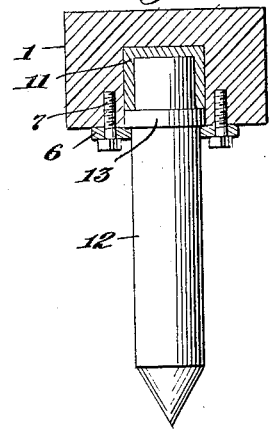
Figure 5 is a view similar to that of Fig. 4, showing another slightly modified form of tooth connected with the frame.

The modified form illustrated in Fig. 4 shows the opening formed on the underside of the frame terminates with a curved formation serving as a bearing for the corresponding upper end portion 9 of the tooth 10, while the modified form illustrated in Fig. 5 shows a metallic cap 11 fitted in the opening formed in the underside of the frame for the reception of the tooth 12, said cap surrounding the upper end portion of the tooth, and adapted to receive the pressure of the top portion of the tooth 12, said tooth being formed with an integral collar member 11 adapted to receive and distribute the shock and pressure of the tooth within the frame; also as shown in Fig. 3.

The frame is formed at its forward end with an upwardly and outwardly beveled portion 12, so shaped that the harrow may be more readily and easily slid over the surface of the ground when turned upside down in order to convey the harrow from one place to another, as is frequently required.

It will be obvious that the portion of the harrow teeth extending outside of the frame may be of any suitable or desirable formation, with an excess of material near the middle portion of each tooth, while the upper end portion of each tooth which is fitted within the opening formed in the frame is formed preferably round to receive the pressure exerted on the tooth and thereby prevents the cutting, defacing or otherwise mutilating the opening, especially when said opening is formed in a wooden frame.

It will be understood that the frame may be formed from any suitable material, and that the openings for the reception of the teeth are formed within the lower face of the frame, thus leaving an unbroken upper face of the frame, thus preventing the entrance of air or snow and water within the frame, which has a tendency to decay the wood and rust the metal of which the harrow frame is usually made, thereby causing a comparatively early deterioration of the harrow, while this particular construction of harrow materially increases its longevity and usefulness.

Having thus described my invention, what I claim and desire to secure by Letters Patent is:

A harrow comprising a plurality of transverse and longitudinal bars spaced apart and fixedly secured together, a series of spaced annular cavities formed in the lower face of each transverse bar, a harrow tooth with an enlarged headed portion detachably fitted within each cavity, and means for rigidly securing each tooth within each cavity of said transverse bars.

JOHN S. RODGERS.